(12) United States Patent
Vorst

(10) Patent No.: US 6,814,578 B2
(45) Date of Patent: Nov. 9, 2004

(54) VISUAL DISPLAY SYSTEM AND METHOD FOR DISPLAYING IMAGES UTILIZING A HOLOGRAPHIC COLLIMATOR

(75) Inventor: Carl J. Vorst, St. Ann, MO (US)

(73) Assignee: The Boeing Company, Chicago, IL (US)

(*) Notice: Subject to any disclaimer, the term of this patent is extended or adjusted under 35 U.S.C. 154(b) by 236 days.

(21) Appl. No.: 10/122,281

(22) Filed: Apr. 11, 2002

(65) Prior Publication Data

US 2003/0194683 A1 Oct. 16, 2003

(51) Int. Cl.[7] .......................... G09B 9/02; G09B 19/16; G09B 9/08
(52) U.S. Cl. ........................... 434/38; 434/29; 434/44; 345/1.1; 359/631
(58) Field of Search ............................... 434/29, 30, 35, 434/38, 43, 44, 69, 307 R, 365, 372; 348/36, 38, 39, 58, 115, 123, 264, 383; 359/13, 15, 19, 20, 22, 26, 32, 451, 454, 459, 631, 725, 728, 729, 900; 345/1.1, 1.3, 6, 7, 31, 32; 349/11, 13, 62, 65, 67; 351/158, 201; 156/242, 245, 307.7

(56) References Cited

U.S. PATENT DOCUMENTS

| | | | |
|---|---|---|---|
| 3,514,871 A | * | 6/1970 | Tucker .......................... 434/44 |
| 3,620,592 A | * | 11/1971 | Freeman ...................... 359/631 |
| 3,632,181 A | * | 1/1972 | Lee ............................... 359/26 |

(List continued on next page.)

FOREIGN PATENT DOCUMENTS

| | | |
|---|---|---|
| EP | 0 302 619 A | 2/1989 |
| EP | 1 003 145 A | 5/2000 |

OTHER PUBLICATIONS

International Search Report, Sep. 15, 2003.
Hubel, Paul, M. and Klug, Michael A., *Color Holography Using Multiple Layers of Du Pont Photopolymer*, SPIE vol. 1667 Practical Holography VI (1992) /215–224.

*Primary Examiner*—Joe H. Cheng
(74) *Attorney, Agent, or Firm*—Shimokaji & Associates, P.C.

(57) ABSTRACT

The present invention provides a visual display system that comprises an image generator and a plurality of adjacent video display modules. The image generator may be adapted to generate a video image viewable by an operator of the visual display system, where the video image may be representative of a portion of a composite display image. The plurality of adjacent video display modules include displays that may be adapted to display the portion of the composite display image, where the video display may be remotely coupled to the image generator and may be responsive to the video image generated by the image generator. The video display modules further comprise a plurality of holographic analogs of collimating mirrors (hereinafter called holographic collimators), each of the holographic collimators associated with each of the modules and positioned between the operator and the video display, where each of the holographic collimators allows the operator to view a portion of a display area of the video display module with a degree of head motion. The holographic collimators associated with adjacent modules are joined together along their edges and positioned to tessellate a sphere partially surrounding the operator, thereby permitting the operator to view the composite display image displayed on the plurality of video display modules through the plurality of holographic collimators and perceive the composite display image as a continuous far-focused virtual image, and wherein the distance of the video image displayed by the video display may be located at substantially half of an effective radius of a holographic analog of the collimating mirrors.

17 Claims, 6 Drawing Sheets

U.S. PATENT DOCUMENTS

| | | | |
|---|---|---|---|
| 3,909,525 A | | 9/1975 | Fagan |
| 3,949,490 A | * | 4/1976 | Derderian et al. ............ 434/44 |
| 4,421,380 A | * | 12/1983 | McGrew ...................... 359/23 |
| 4,473,355 A | * | 9/1984 | Pongratz ...................... 434/44 |
| 4,500,163 A | * | 2/1985 | Burns et al. .................. 359/15 |
| 4,657,512 A | * | 4/1987 | Mecklenborg ............... 434/44 |
| 4,758,089 A | * | 7/1988 | Yokokura et al. ........... 356/458 |
| 5,050,966 A | * | 9/1991 | Berman ...................... 349/194 |
| 5,071,209 A | * | 12/1991 | Chang et al. ................. 359/19 |
| 5,112,121 A | * | 5/1992 | Chang et al. ................. 359/15 |
| 5,123,726 A | * | 6/1992 | Webster ...................... 351/201 |
| 5,130,794 A | * | 7/1992 | Ritchey ...................... 348/39 |
| 5,137,450 A | * | 8/1992 | Thomas ...................... 434/44 |
| 5,164,848 A | * | 11/1992 | Firth et al. .................... 359/13 |
| 5,257,094 A | | 10/1993 | LaRussa |
| 5,320,534 A | * | 6/1994 | Thomas ...................... 434/44 |
| 5,341,229 A | * | 8/1994 | Rowan ........................ 359/10 |
| 5,437,756 A | * | 8/1995 | Carlos et al. ................ 156/245 |
| 5,582,518 A | * | 12/1996 | Henique et al. ............... 434/44 |
| 5,584,696 A | * | 12/1996 | Walker et al. ................ 434/43 |
| 5,619,377 A | * | 4/1997 | Rallison ...................... 359/631 |
| 5,746,599 A | * | 5/1998 | Lechner ....................... 434/44 |
| 5,751,387 A | | 5/1998 | Iigahama et al. |
| 5,790,322 A | | 8/1998 | Kameda et al. |
| 5,828,410 A | | 10/1998 | Drapeau |
| 5,903,395 A | * | 5/1999 | Rallison et al. ............. 359/630 |
| 5,926,153 A | * | 7/1999 | Ohishi et al. ................ 345/1.1 |
| 6,106,298 A | | 8/2000 | Pollak |
| 6,118,414 A | * | 9/2000 | Kintz ........................... 345/7 |
| 6,152,739 A | | 11/2000 | Amery et al. |
| 6,583,874 B1 | * | 6/2003 | Suzuki et al. ............... 356/328 |
| 2003/0129567 A1 | * | 7/2003 | Cabato et al. ................ 434/38 |
| 2003/0156077 A1 | * | 8/2003 | Balogh ......................... 345/6 |
| 2003/0164808 A1 | * | 9/2003 | Amery et al. ................. 345/32 |

\* cited by examiner

VISUAL DISPLAY SYSTEM AND METHOD FOR DISPLAYING IMAGES UTILIZING A HOLOGRAPHIC COLLIMATOR

BACKGROUND OF THE INVENTION

The present invention generally relates to visual display systems and methods and, more specifically, to a visual display system utilizing holographic collimators.

According to U.S. Pat. No. 6,152,739, assigned to the Assignee of the present invention, visual display systems are commonly used to simulate training environments where training through actual operations would be dangerous, expensive or otherwise impractical. One common application for visual display systems may be flight simulation and training systems. A typical flight simulation and training system requires visual "out the window" images simulating the terrain, landscape, cultural features such as buildings, roads and bridges, vehicles, and other aircraft in the simulated vicinity of the trainee. One form of conventional flight simulator includes the projection of images onto the inside of a large spherically-shaped dome or partial dome structure. The images are displayed inside the domes using video projectors and associated optical devices mounted inside the domes. These projectors and optics must be carefully positioned inside the domes in order to properly display the simulated images. Another conventional form of a flight simulator typically includes one or more flat video display screens onto which video images are projected by one or more conventional video projectors. The video images may be projected onto the display screens from either the front or the rear of the screens. An example of such a conventional flight simulator may be the Visual Integrated Display System (VIDS), manufactured by The Boeing Company. The VIDS provides four rear-projected video screens positioned a few feet from the trainee used to display simulated images in front of the trainee and up to three additional rear-projected display screens used to display simulated images behind the trainee. Conventional flight simulators also usually include displays and indicators to monitor the simulated aircraft status, and controls, such as a stick and throttle for providing input to the simulation controller in response to the displayed video images. The displays, indicators, controls and other elements of the surrounding pilot environment are often realistic simulations of the environment present in the actual aircraft. Thus, the operator can simulate the flight of an aircraft and can respond to what is depicted by the simulated image on the visual display and to the other displays and indicators.

One primary objective of flight simulators may be to enhance and optimize the simulated images to present the operator with a high fidelity and realistic training environment. Problems experienced by conventional flight simulators, especially those incorporating conventional video projection systems to display the simulated image, include lower than desired brightness and contrast, and a low resolution of the projected images. These problems arise in large part because of the capability of conventional video projectors, and the use of a relatively small number of video screens (necessitating that each video projector project a relatively large image). Additionally, conventional flight simulators generally provide a simulated image that may be focused relatively close to the trainee's eyes, and not at a far distance, which hinders the perception of depth and results in incompatibilities with other aircraft equipment such a head-up display (HUD) and a helmet mounted display (HMD). An improved flight simulator would produce a virtual image that may be focused at or near infinity so that the virtual image appears sufficiently real to the simulation pilot and would be compatible with a HUD and an HMD. Such an improved flight simulator would be of great assistance to both air-to-air and air-to-ground military combat training, which require eye-limiting resolution, i.e., display resolution that meets or exceeds the resolution of the human eye. Another drawback to conventional flight simulators may be the size of the projectors, display screens, and associated electronics and optics. An improved flight simulator would have a reduced overall size, allowing the entire simulator to be located in a small room, thus reducing the cost of installing and operating the flight simulator.

Such an improved flight simulator, described in U.S. Pat. No. 6,152,739, includes a visual display system that comprises video image generation and display modules. Each module includes: an image generator, a video display operatively connected to the image generator, and adjacent lenses. Each lens may be associated with one module and positioned between the operator and the video display so that the operator views the composite display image displayed on the video displays through the lenses.

Unfortunately, the past methods and apparatus (including the aforementioned prior art improved flight simulator) for producing display images have disadvantages. There are problems associated with using lenses. For example, conventional lenses of the size needed by the visual display system of the present invention are expensive and difficult to manufacture. In addition, if the lenses were expected to have achromatic properties, which describes a characteristic in which light of all wavelengths is refracted to the same degree, a combination of convex and concave lenses, each with different indexes of refraction, would need to be used thereby adding to the difficulty and cost of manufacture.

Fresnel type lenses, which are most preferably used by the prior art display module to present a collimated image to the observer, generally are poor devices for this function. To collimate is to bring into line or make parallel, which is a close approximation of the nature of rays of light reaching an observer's eyes from a point on a distant object or image. To collimate an image to make it appear at a large distance, for example, is to bring it closer to the ideal condition of all waves emanating from a specific point on the image being exactly parallel. The interpretation of this parallelism as representing distance is a "learned" characteristic of the human visual system.

Problems associated with using a Fresnel lens (which is a single element piano-convex lens which has been divided into concentric rings, with each ring collapsed to a common plane parallel to the piano side of the lens) include the same chromatic problems as for the aforementioned simple lenses, resulting in color smearing of an image viewed through the lens. This also results in a loss of image clarity. The color smearing of a single element lens is well understood. Also, a Fresnel lens (which usually is a special case of a simple plano-convex lens) includes a curved surface that may be divided into a usually uniform set of annular rings. Each ring may then be collapsed toward the piano surface of the lens, producing a thin piece of material that exhibits the light bending properties similar to that of the original, much thicker lens. Collapsing the rings produces a set of concentric grooves separated by walls standing in the direction of the central axis of the lens. The grooves, and particularly the walls separating the grooves, result in degeneration of image quality due to diffraction and shadowing of rays hitting the walls.

Additionally, while a Fresnel lens makes a good collimator for single point sources of light energy, it may be a poor collimator of a two dimensional image. A Fresnel lens characteristically produces a high degree of image distortion as the eye's viewpoint of the image moves off the central optical axis. This can result in both a vertical shift and a horizontal shift of the image as viewed by the right eye versus the left eye. While the human visual system is somewhat tolerant of a horizontal shift, it is highly intolerant of a vertical shift. Further, for a display system comprised of an array of Fresnel lens devices, images in adjacent optical fields move in opposite directions relative to each other at the junction of the adjacent optical fields as a function of head motion, making it impossible to maintain registration of adjacent, otherwise contiguous, images.

Another limitation of the prior art visual display system, and of compact visual display systems in general, may be the inability to train operators in a realistic front and rear two person cockpit, sometimes referred to as a tandem cockpit, while providing a collimated image to both. To date, the most practical approach would be to place the tandem cockpit within a large radius dome, with a radius large enough to provide the appearance of collimation. There are several disadvantages to this approach. In order to approach adequate collimation performance, these domes may require a radius of 20 feet or more. This large size results in a relatively dim, low contrast, image on the surface of the dome and requires a large facility to house the equipment. With conventional video display systems, such as the one previously described in U.S. Pat. No. 6,152,739, separate visual systems are required for both pilots in the tandem cockpit. The disadvantage of such an approach results in the rear pilot's inability to view the actions of the front pilot, nor is either pilot able to provide non-verbal communications with one another necessary for crew coordination training. Additional disadvantages of the previously described approach are the increased cost of providing two separate cockpits instead of one combined cockpit, and the increased cost of a larger facility space in which to house the separate cockpits.

As can be seen, there is a need for an improved apparatus and method that displays video images, reduces color smearing and increases image clarity and quality, may be a good collimator of a two dimensional image, can maintain registration of adjacent, otherwise contiguous, images as a function of head motion, and provides the ability to train pilots in a realistic tandem cockpit environment.

SUMMARY OF THE INVENTION

In one aspect of the present invention, a visual display system comprises an image generator and a plurality of adjacent video display modules. The image generator may be adapted to generate a video image viewable by an operator of the visual display system, where the video image may be representative of a portion of a composite display image. The plurality of adjacent video display modules include displays that may be adapted to display the portion of the composite display image, where the video display may be remotely coupled to the image generator and may be responsive to the video image generated by the image generator. The video display modules further comprise a plurality of holographic analogs of collimating mirrors (hereinafter called holographic collimators), each of the holographic collimators associated with each of the modules and positioned between the operator and the video display, where each of the holographic collimators allows the operator to view a portion of a display area of the video display module with a degree of head motion. The holographic collimators associated with adjacent modules are joined together along their edges and positioned to tessellate a sphere partially surrounding the operator, thereby permitting the operator to view the composite display image displayed on the plurality of video display modules through the plurality of holographic collimators and perceive the composite display image as a continuous far-focused virtual image, and wherein the distance of the video image displayed by the video display may be located at substantially half of an effective radius of a holographic analog of the collimating mirrors.

In another aspect of the present invention, a method for displaying images comprises generating a video image representative of a portion of a composite display image by a first module, storing, by a second module, data accessed by the first module to generate the video image, displaying the portion of the composite display image by a third module, and permitting the viewing of the displayed portion of the composite display image through a holographic representation of a fourth module.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
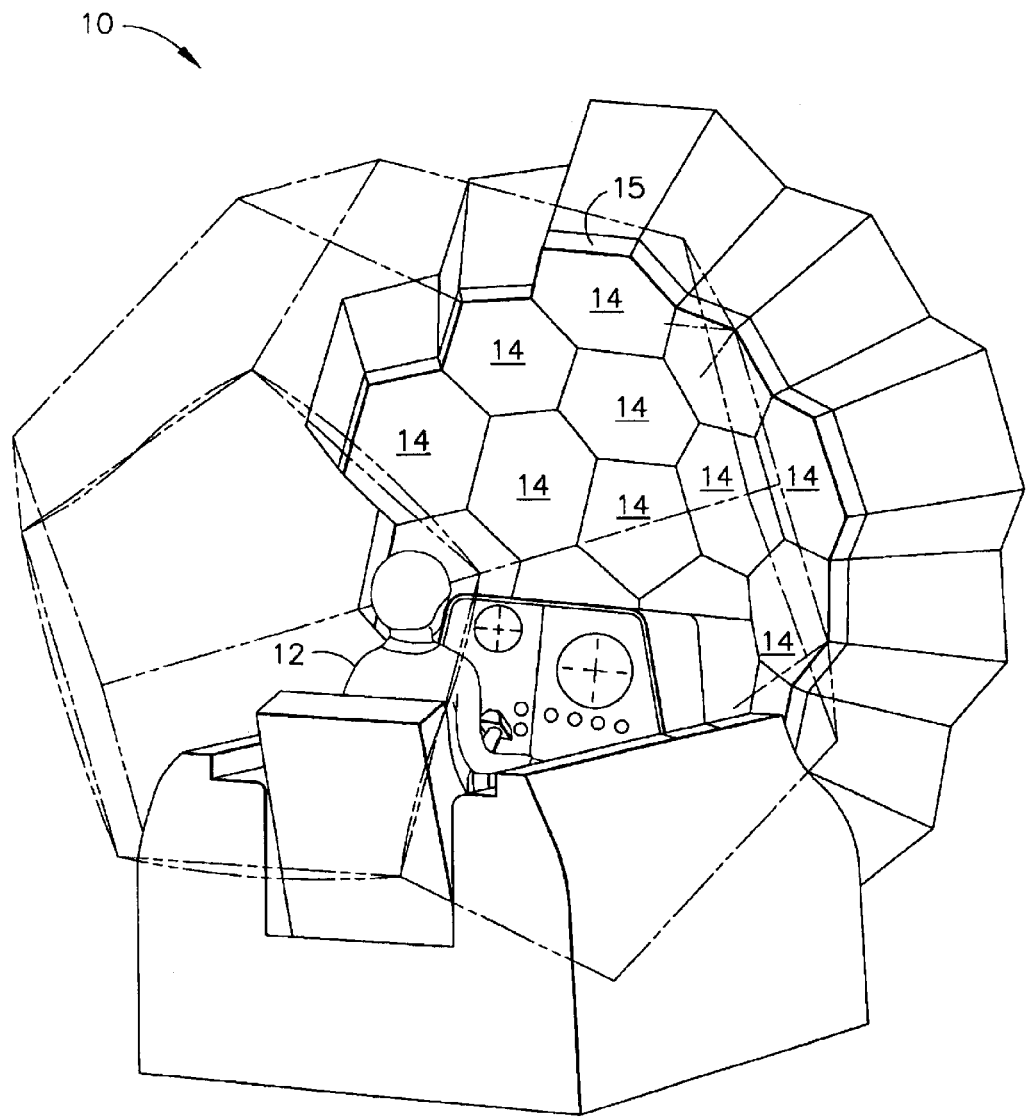
FIG. 1 is a perspective view of the presently preferred visual display system as incorporated into a flight simulator.

Referring to FIG. 1, a visual display system 10 of the present invention is shown. According to U.S. Pat. No. 6,152,739, assigned to the Assignee of the present invention and incorporated herein by reference, the visual display system 10 may be preferably used in conjunction with a flight simulation system used to train aircrew to fly and operate an aircraft. The flight simulation system typically includes a simulation pilot 12 facing, or surrounded by, an array of display modules 14. As in a conventional flight simulator, the pilot 12 may move his head during the simulation system within a three-dimensional space known as a viewing volume. As further described below, the display modules 14 include appropriate electronics and computer equipment to generate a video image and display the image to the pilot 12. Thus, the array of display modules 14 generate and display an appropriate "out-the-window" scenario simulating the outdoor environment that might be typically seen by the pilot flying an actual aircraft. This computer-generated scenario typically includes the terrain, landscape, cultural features such as, buildings, vehicles, and other simulated aircraft flying in the vicinity of the pilot's simulated position. Preferably, each display module 14 generates and displays a portion of the overall out-the-window image so that the array of modules will display the overall images as a composite display image to the pilot 12. The display modules 14 are preferably arranged side-by-side in an array fashion completely or partially surrounding the pilot 12 to provide a continuous image (forming up to a 360 degree solid angle) as viewed from the pilot's 12 predetermined viewing volume. The display modules 14 are preferably mounted in a supporting structure 15 designed to hold each of the modules 14.

As may be customary, the pilot 12 may also be provided with a conventional or simulated cockpit comprised of an array of cockpit components such as a throttle, flight stick and associated controls and indicators, a number of head-down cockpit displays displaying various navigation, situational and tactical information, and either a real or simulated head-up display. The pilot 12 may be positioned in a predefined viewing volume facing the array of display modules 14. The pilot 12 has an associated field of view concentrically surrounding a line of sight extending outwardly from the pilot's viewing volume in a direction toward the array of modules 14.

Figure 2:
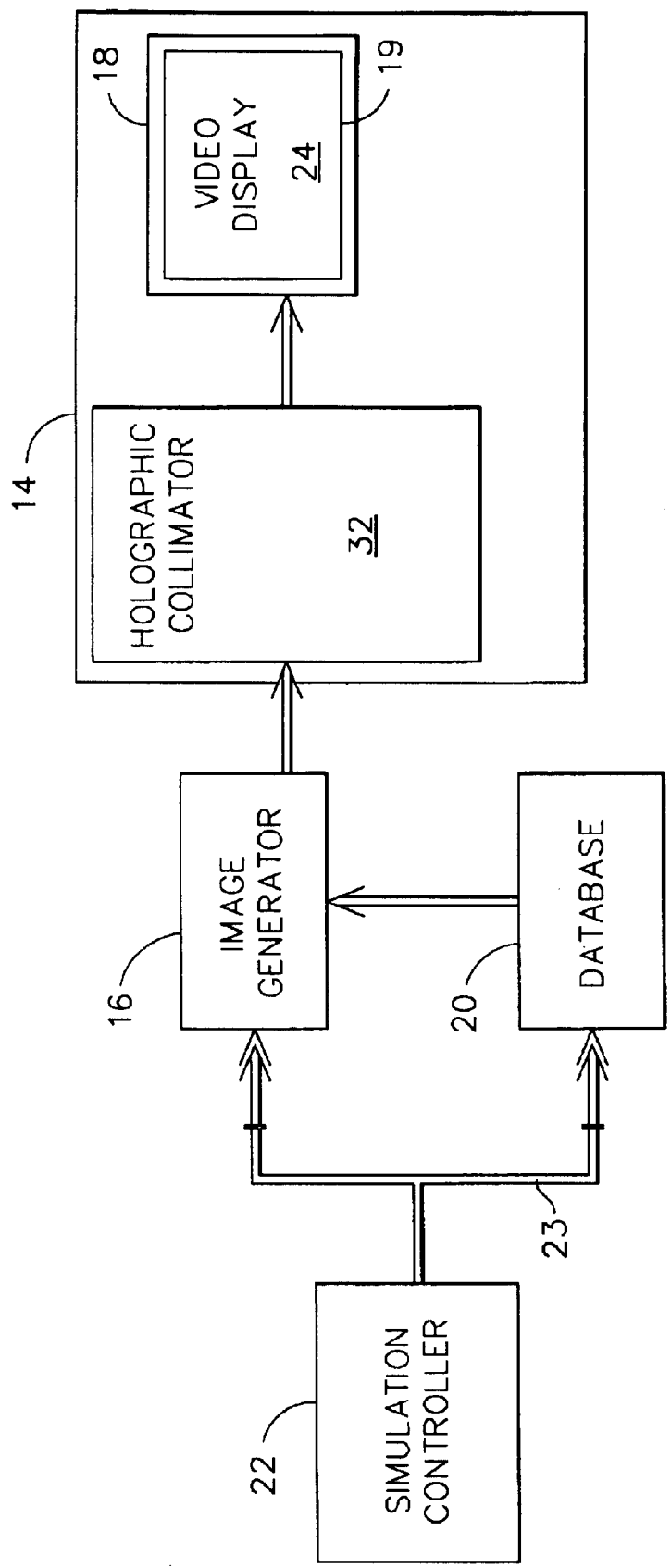
FIG. 2 is block diagram showing the presently preferred major components of one embodiment of the present invention.

Referring now to FIG. 2, the major components of the presently preferred visual display system 10 are illustrated. These components include a display module 14, an image generator 16, a database 20 and a display system controller (simulation controller) 22. Each display module 14 preferably includes a video display 18 which includes a small border 19 surrounding an active or viewed display area 24 and a holographic collimator 32 (such as a holographic analog of a collimating mirror). While it may be physically possible to tile an array of video displays 18 together, it may be generally impossible using commercially-available low cost video displays having a border 19 to display a continuous image, as the image will be interrupted by the borders 19. The present invention solves this problem by incorporating the holographic collimator 32 that permits the operator to view the image, or a fraction thereof, displayed in the viewed display area 24. The holographic collimator 32 creates holographic images at a distance behind the collimator. As such, the video displays 18 project images that appear to come from an effectively infinite distance.

One or more of the video displays 18 are remotely coupled to the image generator 16 which may be coupled to and receive data from the database 20. The data may be processed based on the simulated position of the operator's aircraft, and a video image representative of a portion of the composite display image can be generated and presented to the pilot 12. Each image generator 16 generates a portion of the composite display image associated with the position of the video display 18 associated with the image generator 16 within the array. Thus, each display module 14 has an associated address indicating its relative position within the array of modules 14 incorporated into the video display system 10. The module 14 uses this address to retrieve the appropriate data from the database 20 from which to generate the appropriate image for display at the module's location.

The database 20 includes a multi-dimensional structural database that may be used by the image generator 16 to create the portion of the composite display image that will be displayed on an associated video display 18. In a preferred embodiment, the contents of the database are downloaded during initiation of the simulation session across a communication link into a memory unit (not shown) contained within the module 14. In an alternative embodiment, a copy of the database 20 may be provided and maintained in a central computer system (not shown) that may be accessible by the image generator 16. In yet another embodiment, the database 20 (or portions thereof) may be updated during the simulation session from a central computer system.

Preferably, the visual display system 10 includes a simulation controller 22 that provides overall control of the flight simulation. The simulation controller 22 allocates a particular portion of the overall composite display image to each of the display modules 14 and provides a viewing location defining an address into the database 20 storing the data and information necessary for the image generator 16 to generate, and the display module 14 to display, a portion of the overall composite display image. Communication between the image generator 16, the database 20, and the simulation controller 22, may occur via a wide band communication link 23, such as, for example, an Ethernet type communication bus or, in an alternative embodiment, via a wireless communication link.

Each video display 18 may be associated with a collimator, preferably a multi-spectral holographic collimator 32. The holographic collimator 32 may be a holographic analog of a collimating mirror. The holographic collimator 32 can create a virtual image of a video display 18, when the video display 18 is placed behind the holographic collimator 32. When the video display 18 is placed at one half of the effective focal distance of the holographic collimator 32, the virtual image from such a physical arrangement, appears to come from an effectively infinite distance thereby precisely simulating out-the-window scenes. Such an arrangement describes that of the preferred embodiment.

In the preferred embodiment, the holographic collimator 32 consists of at least one of the following elements: a thin panel off-axis holographic lens (which collimates the light from the video display in an off-axis direction) comprised of a set of three narrowband holograms (red, blue, green), and a second off-axis holographic lens comprised of a set of three narrow band holograms (red, blue, green), which directs the image back to the initial on-axis direction.

The image generator 16 may enlarge the video image thereby permitting the operator to view the composite display image as a continuous image with a degree of head motion. The image source may be made larger than that required for viewing on the optical axis to allow some lateral (right/left or up/down) motion without seeing the edge of the image surface when viewed through or off the holographic collimator 32. If the holographic collimators 32 are butted together, with the image source made larger than minimally required, it may be possible to view a continuous image with a degree of head motion depending on how large the image source may be made.

Figure 3:
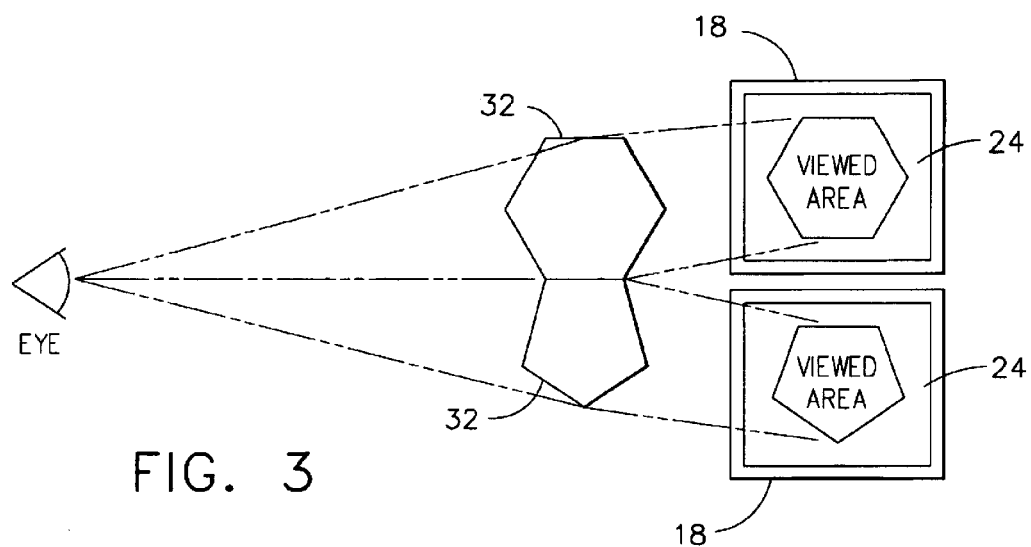
FIG. 3 is a representative diagram showing a preferred holographic collimator in accordance with one embodiment of the present invention.

Each holographic collimator 32 may be preferably mounted to a structural module 15 that also holds one of the display modules 14. Preferably, the holographic collimator 32 may be mounted parallel to the surface of the video display 18 with its optical axis pointed toward the simulation pilot 12. FIG. 3 illustrates how the holographic collimator 32 preferably permits the operator to view the composite display image displayed on the plurality of video displays through a holographic representation of a spherical collimating mirror. As such, the pilot 12 views a portion of the active display area 24 of the video display 18. Thus, some of the image generated and displayed on the video display 18 may be displayed outside of the portion of the active display area 24 viewed by the pilot 12 through the holographic collimator 32 to accommodate continuous imagery as the pilot 12 moves or rotates his head. Preferably, the image displayed on a particular video display 18 overlaps the image displayed on adjacent video displays 18 to further accommodate situations in which the pilot 12 moves or rotates his head. By having each video display 18 display partially overlapping images, the pilot 12 continuously views a composite virtual image. For purposes of simplicity, FIG. 3 only illustrates two video displays 18 and associated holographic collimators 32.

The focal length of the holographic collimator 32 may be preferably optimized for the particular size of the simulator, the size of the video displays 18, to accommodate the operator's anticipated head movement and to provide an apparent virtual image location at or near infinity.

The image displayed on the video display 18 may be viewed by the pilot 12 through the holographic collimator 32. The video displays 18 are arranged and positioned at a distance from the holographic collimating screen 32 such that the image displayed on them, as seen by the pilot 12 through the holographic collimator 32, requires the eyes to slightly converge (or be parallel), allowing the pilot 12 to perceive a far-focused or collimated virtual image. Thus, the image may be perceived to be at distance from the pilot 12 that may be greater than the distance between the pilot 12 and the video display 18.

Collimation of an image presented on the video display 18 by the holographic collimator 32 is similar to that produced by a conventional physical mirror and beamsplitter collimator and its variations. In the conventional mirror and beamsplitter collimating optics, a video display is placed at half of the radius of curvature of a spherical collimating mirror. The position of the video display is optically folded out of view of the observer by using a partially reflective, partially transmissive mirror (most commonly called a beamsplitter.) The preferred shape of the video display is spherical, which results in a minimal amount of image distortion as the observer's position is moved away from the central optical axis, although for cases, such as with the current invention, this distortion may be insignificantly small if a video display with a relatively flat image is used.

Each video display 18 may be arranged with its associated holographic collimator 32 such that the surfaces of the video display 18 and holographic collimator 32 are essentially parallel with the center of each holographic collimator 32 perpendicular to the line of sight of the pilot 12. The array of modules 14 form an enclosure, or partial enclosure, surrounding the pilot 12 so that the simulation pilot 12 views the continuous virtual image from inside the enclosure.

In an alternate embodiment, the visual display system 10 includes a first set of video display modules (first modules) adjacent to a second set of video display modules (second modules). Each of the modules comprise a video display which may be adapted to display a portion of the composite display image, may be coupled to the image generator and may be responsive to the video image generated by an image generator. The first modules comprise a plurality of holographic collimators while the second modules comprise a plurality of lenses. Each of the collimators and lenses are associated with each of the first and second modules, respectively, and are positioned between the operator and the video displays, wherein each of the collimators and lenses restrict the operator's field of view such that the operator views only a portion of a display area of the video display. The collimators and lenses associated with adjacent modules are joined together along their edges and positioned to tessellate a sphere partially surrounding the operator, thereby permitting the operator to view the composite display image displayed on the plurality of video displays through the plurality of collimators and lenses and perceive the composite display image as a continuous far-focused virtual image. The collimators are oriented parallel to their associated video displays and substantially perpendicular to a line extending from the operator's viewing volume to a center of the associated video displays (which display images requiring great clarity), while the lenses are oriented parallel to their associated video displays and at a periphery of the operator's viewing volume (which display images not requiring great clarity).

Figure 4:
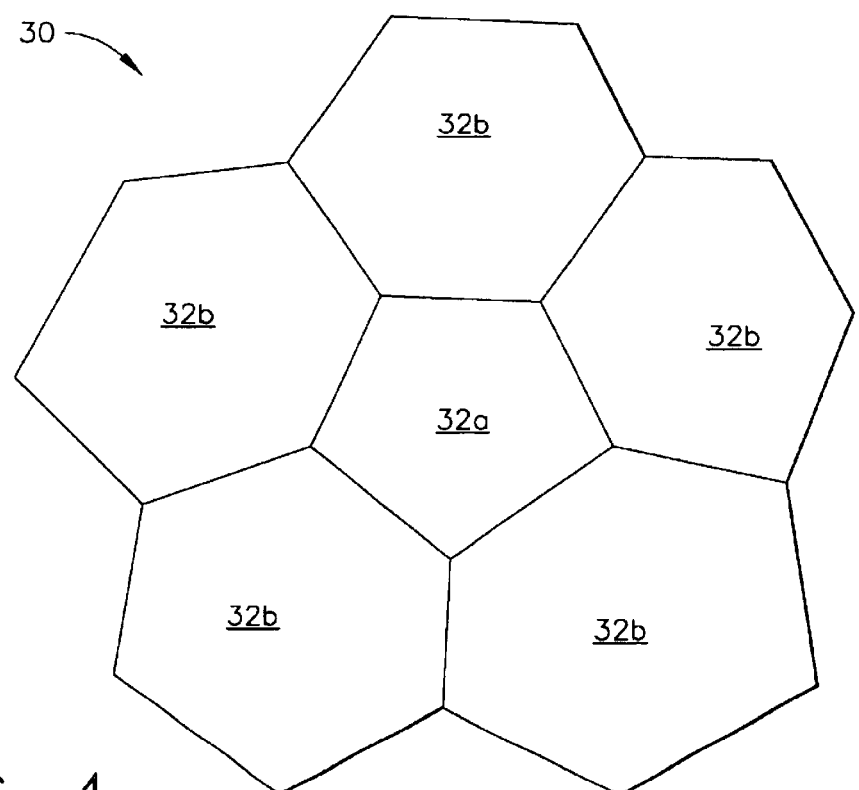
FIG. 4 is an illustration showing six holographic collimators arranged in accordance with one embodiment of the present invention.

Preferably, each holographic collimator 32 may be five or six-sided to allow them to be joined together to form a spherical-like structure. FIG. 4 shows a front view of an array of six holographic collimators 32 mounted edge to edge. Each of the holographic collimators 32 may be preferably arranged such that their surface may be substantially perpendicular to the pilot's line of sight. The array of holographic collimators 32 illustrated in FIG. 4 may thus be used to form a partial enclosure placed in front of the pilot 12. As will be appreciated, this array of holographic collimators 32 may be expanded to form a larger partial enclosure encircling the pilot 12 or, using an appropriate number of holographic collimators, may form a complete enclosure completely surrounding the pilot 12. The holographic collimator 32 are preferably machined and aligned edge to edge with their adjacent collimators.

The display modules 14 are located behind each of the holographic collimators 32. Thus, the video display system 10 may include as many display modules 14 (and associated holographic collimators 32 and image generators 16) as required to obtain the desired viewing angle. The representative array of six collimators illustrated in FIG. 4 has about a 50 degree solid viewing angle. This array may be formed using one pentagon-shaped center collimator 32a and five hexagon shaped surrounding collimators 32b. As the desired viewing angle increases, more display modules 14 can be incorporated into the video display system 10. As known to those skilled in the art, the tessellation of a partial or complete sphere with (flat) holographic collimators 32 has many solutions. One preferred solution uses a combination of three differently shaped hexagonal shaped lenses and one perfect pentagonal shaped lens. Of course, many other solutions are available and are within the scope of the present invention.

Figure 5:
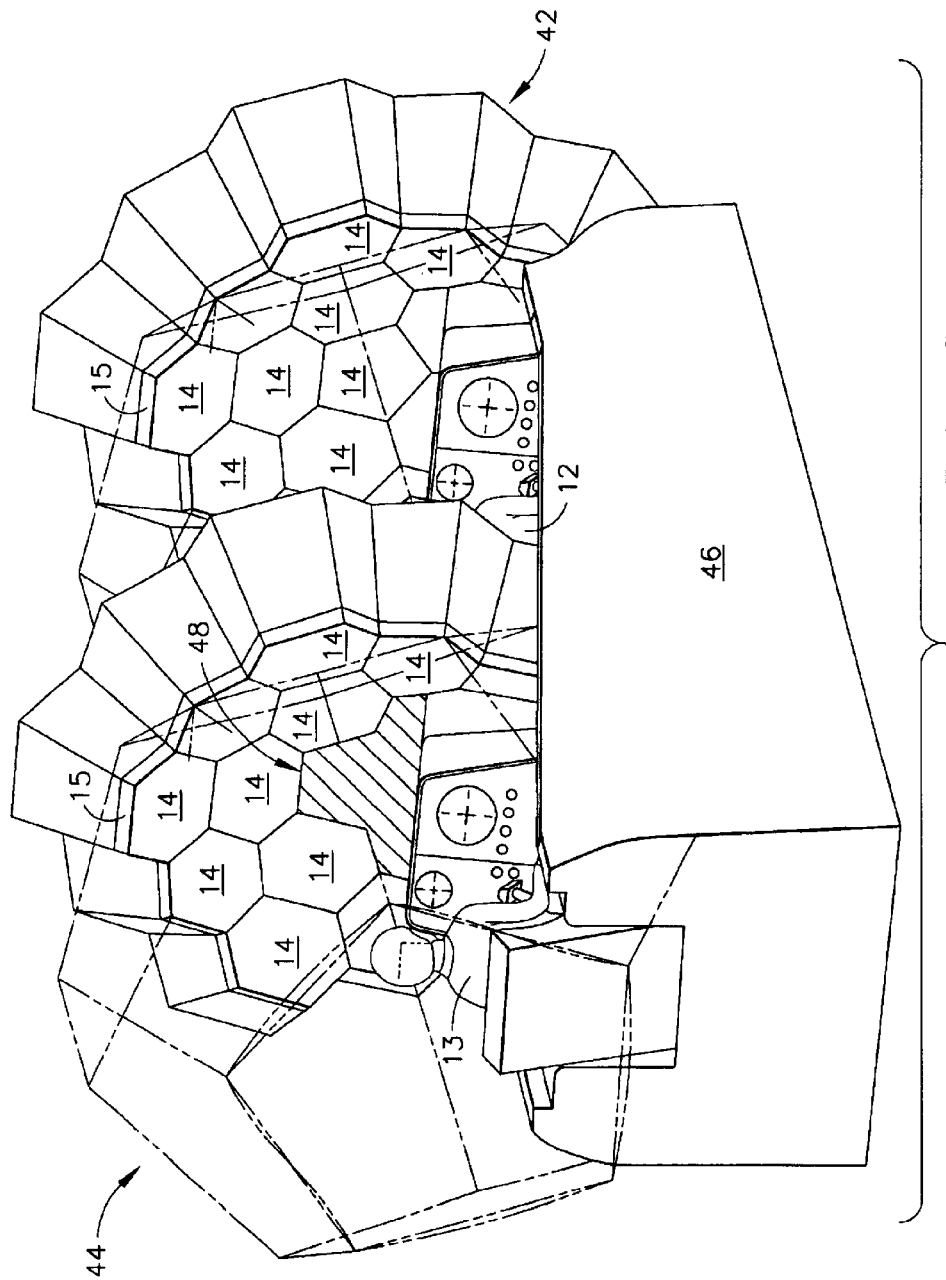
FIG. 5 is a perspective view of the presently preferred first and second visual display systems as incorporated into a tandem flight simulator.

Referring now to FIG. 5 an aircraft flight simulator 40 comprising a first and second visual display system 42 and 44, respectively, is depicted. Utilizing such a display system 40 may be advantageous to provide a realistic and "real-time" pilot and co-pilot training scenario. The first visual display system 42 may be adapted to be operated by a first operator 12 (i.e., the pilot or front pilot), while the second visual display system 44 may be adapted to be operated by a second operator 13 (i.e., the co-pilot or rear pilot). The visual display systems 42 and 44 are similar in appearance to and provide similar functionality as the visual display system 10. There are some important variances however.

The second visual display system 44, may be preferably connected to and located behind and at a height above the first visual display system 42. A portion of the display modules 14 in the second visual display system 44 may be removed 48, giving the rear pilot 13 a view of the front pilot 12 so that the rear pilot 13 may observe and the actions of and communicate with the front pilot 12. In addition, the rear pilot 13 may be able to see a portion of the display modules 14 surrounding the front pilot 12. Because the display modules 14 for the front pilot 12 and the rear pilot 13 are collimated or near collimated, the images displayed by both sets of display modules 14 will appear as a continuous image by the rear pilot 13. In alternate embodiments, the second visual display system 44 may be at a similar height or a different location as the first visual display system 42, and the second visual display system 44 may not have display modules 14 removed.

Figure 6:
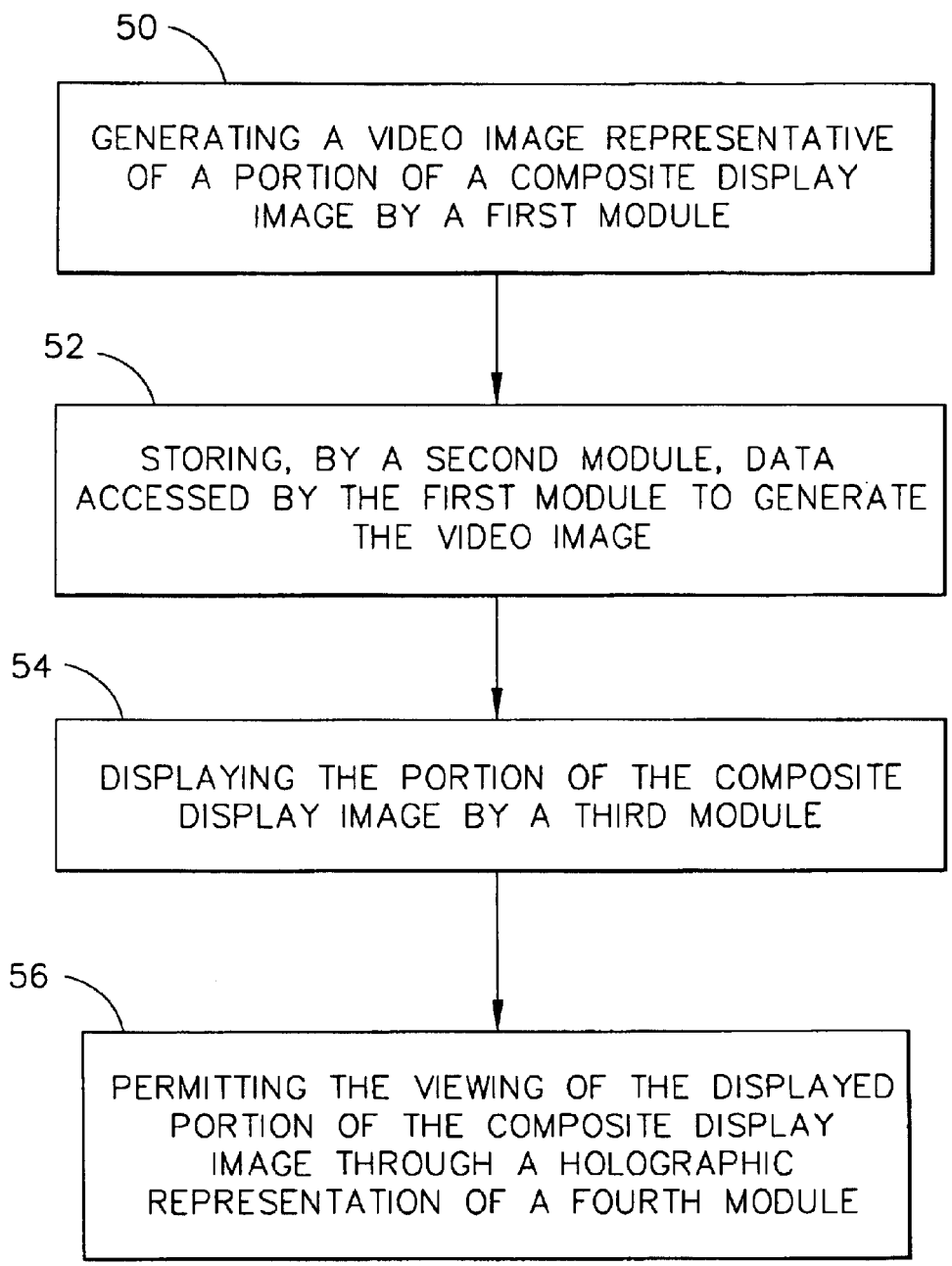
FIG. 6 is a diagram describing a method of the present invention for displaying images.

Referring now to FIG. 6, a method for displaying images is provided. Generating a video image representative of a portion of a composite display image by a first module (such as, for example, the image generator 16) occurs at step 50. Storing, by a second module (such as, for example, the database 20), data accessed by the first module to generate the video image and displaying the portion of the composite display image by a third module (such as, for example, the video display 18) occur, respectively, at steps 52 and 54. The method proceeds to step 56 where the viewing of the displayed portion of the composite display image can be permitted through a holographic representation of a fourth module (such as, for example, the holographic collimator 32). The method may further include overlapping the portion of the composite display image displayed on the third module with portions of the composite display image displayed on adjacent third modules.

Figure 7:
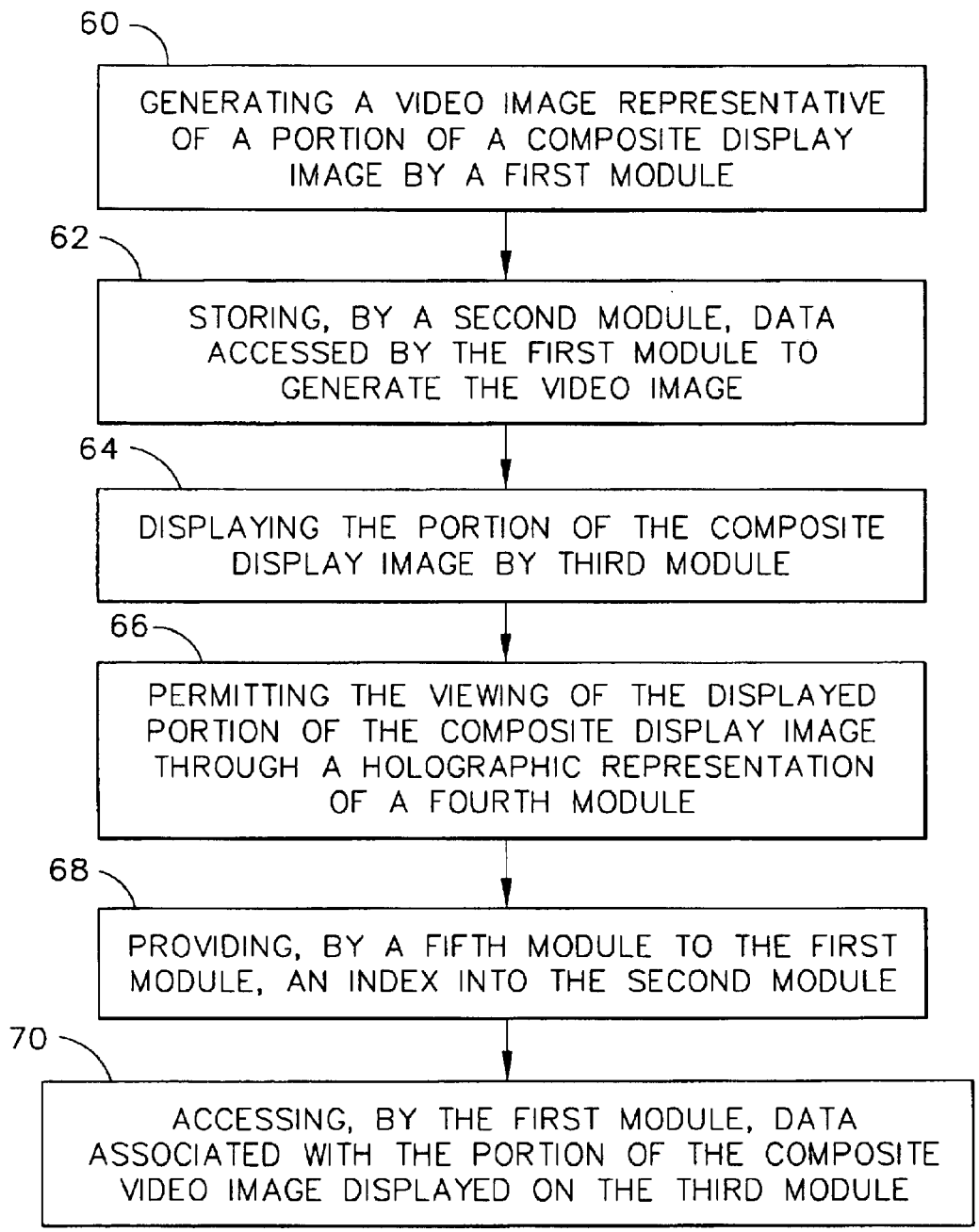
FIG. 7 is a diagram describing a further method of the present invention for displaying images.

Referring now to FIG. 7, a further method for displaying images is provided. Generating a video image representative of a portion of a composite display image by a first module occurs at step 60. Storing, by a second module, data accessed by the first module to generate the video image and displaying the portion of the composite display image by a third module occur, respectively, at steps 62 and 64. The method proceeds to step 66 where a view of the displayed portion of the composite display image can be permitted through a holographic representation of a fourth module. Providing, by a fifth module (such as, for example, the display system controller 22) to the first module, an index into the second module, and accessing, by the first module, data associated with the portion of the composite video image displayed on the third module occur, respectively, at steps 68 and 70.

In an alternate embodiments, the steps presented above with reference to FIGS. 6 and 7 may be performed by one of the modules or a portion of the modules. Further, unless otherwise stated, the modules may be co-located and directly coupled or independently located and remotely coupled.

As can be appreciated by those skilled in the art, the present invention provides an improved visual display system and method for displaying images utilizing a holographic collimator. By using holographic collimators in a visual display system, image color smearing may be reduced, image clarity and quality may be increased, and registration of adjacent, otherwise contiguous, images are maintained as a function of head motion. The present invention further provides the ability to train operators of visual display systems in a realistic tandem cockpit environment.

It should be understood, of course, that the foregoing relates to preferred embodiments of the invention and that modifications may be made without departing from the spirit and scope of the invention as set forth in the following claims.

I claim:

1. A visual display system comprising:
   an image generator adapted to generate a video image viewable by an operator of the visual display system, wherein the video image may be representative of a portion of a composite display image; and
   a plurality of adjacent video display modules comprising:
      a video display adapted to display the portion of the composite display image, wherein the video display may be remotely coupled to the image generator and may be responsive to the video image generated by the image generator; and
      a plurality of holographic collimators, each of the collimators associated with each of the modules and positioned between the operator and the video display, wherein each of the collimators allows the operator to view a portion of a display area of the video display with a degree of head motion, and wherein each of the plurality of collimators comprise at least one of a following element from a group consisting of a first thin panel off-axis holographic lens collimating the light from the video display in an off-axis direction and a second thin panel off-axis holographic lens directing the video image to an on-axis direction;
   wherein the holographic collimators associated with adjacent modules are joined together along their edges and positioned to tessellate a sphere partially surrounding the operator, thereby permitting the operator to view the composite display image displayed on the plurality of video displays through the plurality of holographic collimators and perceive the composite display image as a continuous far-focused virtual image; and
   wherein the distance of the video image displayed by the video display may be substantially at half the effective radius of a holographic analog of the collimators.

2. The visual display system of claim 1 further comprising a database, the database comprising data accessed by the image generator to generate the video image, wherein the database may be operably coupled to the image generator.

3. The visual display system of claim 2 further comprising a display system controller adapted to provide each module with an index into the database thereby allowing the image generator to access data associated with the portion of the composite video image displayed on the video display, wherein the display system controller may be operably coupled to the image generator and to the database.

4. The visual display system of claim 3, wherein the display system controller receives inputs from the operator.

5. The visual display system of claim 1, wherein the image generator generates the video image such that the operator may view the composite display image as a continuous image with a degree of head motion.

6. The visual display system of claim 1, wherein the portion of the composite display image displayed on each video display overlaps the portion of the composite display image displayed on adjacent video displays and wherein each collimator may be positioned such that the portion of the display area viewed by the operator through each collimator does not overlap any of the portion of the display area viewed by the operator through adjacent collimators.

7. The visual display system of claim 1, wherein each of the plurality of collimators are oriented parallel to their associated video displays and substantially perpendicular to a line extending from the operator's viewing volume to a center of the associated video displays.

8. The visual display system of claim 1 wherein:
the first thin panel off-axis holographic lenses is comprised of a set of three narrowband holographic lenses collimating the light from the video display in an off-axis direction; and wherein
the second thin panel off-axis holographic lenses is comprised of a set of three narrowband holographic lenses directing the video image to an on-axis direction.

9. The visual display system of claim 1, wherein the holographic collimators are holographic collimating mirrors.

10. An aircraft flight simulator comprising:
a first visual display system adapted to be operated by a first operator; and
a second visual display system adapted to be operated by a second operator, wherein the second visual display system may be co-located with the first visual display system and may be located behind the first visual display system:
wherein the visual display systems comprise:
an image generator adapted to generate a video image viewable by the operators of the visual display system, wherein the video image may be representative of a portion of a composite display image; and
a plurality of adjacent video display modules comprising:
a video display adapted to display the portion of the composite display image, wherein the video display may be remotely coupled to the image generator and may be responsive to the video image generated by the image generator; and
a plurality of holographic collimators, each of the collimators associated with each of the modules and positioned between the operators and the video display, wherein each of the collimators allows the operators to view a portion of a display area of the video display with a degree of head motion;
wherein the collimators associated with adjacent modules are joined together along their edges and positioned to tessellate a sphere partially surrounding the operator, thereby permitting each of the operators to simultaneously and independently view the composite display image displayed on the plurality of video displays through the holographic collimators and perceive the composite display image as a continuous far-focused virtual image; and
wherein a portion of the second visual display system does not contain any video display modules such that the second operator can directly view the positions and movements of the first operator.

11. The aircraft flight simulator of claim 10 wherein the second operator can view parts of the composite display image on the first visual display system that do not appear on the second visual display system.

12. The aircraft flight simulator of claim 11 wherein the second operator can view the part of the composite display image on the first visual display system together with the portion of the composite display of the second visual display system as a continuous image with a degree of head motion.

13. A visual display system comprising:
an image generator adapted to generate a video image viewable by a first pilot and a second pilot of the visual display system, wherein the video image may be representative of a portion of a composite display image; and
a first set of video display modules adjacent to a second set of video display modules, each of the video display modules comprising a video display adapted to display the portion of the composite display image, wherein the video display may be coupled to the image generator and may be responsive to the video image generated by the image generator;
wherein the first set of video display modules comprise a plurality of holographic collimators, each of the collimators associated with each of the video display modules of the first set and positioned between the first pilot and the video display, wherein each of the collimators restricts the first pilot's field of view such that the first pilot views only a portion of a display area of the video display;
wherein the second set of video display modules comprise a plurality of holographic collimators, each of the holographic collimators associated with each of the video display modules of the second set and positioned between the second pilot and the video display, wherein each of the holographic collimators restricts the second pilot's field of view such that the second pilot views only a portion of a display area of the video display;
wherein the collimators associated with adjacent video display modules are joined together along their edges and positioned to tessellate a sphere partially surrounding each pilot, thereby permitting pilot to view the composite display image displayed on the plurality of video displays through the plurality of collimators and perceive the composite display image as a continuous far-focused virtual image; and
wherein the second set of video display modules contains less video display modules than the first set of video display modules such that the second pilot can directly view the positions and movements of the first pilot.

14. A method for displaying images, the method comprising:
providing the visual display system of claim 1 comprising an image generator, a database, and a plurality of adjacent video display modules, wherein the video display modules include a video display and a plurality of holographic collimators:
generating a video image representative of a portion of a composite display image with the image generator;
storing data accessed by the image generator to generate the video image created from the database;
displaying the portion of the composite display image with the video display; and
permitting the viewing of the displayed portion of the composite display image through a holographic representation using the plurality of holographic collimators.

15. The method of claim 14 further comprising accessing data associated with the portion of the composite video image displayed on the video display with the image generator.

16. The method of claim 14 further comprising overlapping the portion of the composite display image displayed on the video display with portions of the composite display image displayed on adjacent video displays.

17. A method for displaying images, the method comprising:
- providing the visual display system of claim 1 comprising an image generator, a data base, and a plurality of adjacent video display modules, wherein the video display modules include a video display and a plurality of holographic collimators;
- generating a video image representative of a portion of a composite display image with the image generator;
- storing data accessed by the image generator to generate the video image created from the database;
- displaying the portion of the composite display image with the video display;
- permitting the viewing of the displayed portion of the composite display image through a holographic representation using the plurality of holographic collimators providing a display system controller and indexing into the database with the display system controller; and
- accessing data associated with the portion of the composite video image displayed on the video display with the image generator.

* * * * *